United States Patent
Jiang et al.

(10) Patent No.: US 8,245,284 B2
(45) Date of Patent: Aug. 14, 2012

(54) EXTENSIBLE NETWORK DISCOVERY

(75) Inventors: Shawn Jiang, Lynnwood, WA (US); Taroon Mandhana, Redmond, WA (US); Saurabh Mahajan, Redmond, WA (US); Alok Manchanda, Redmond, WA (US); Yue Chen, Bellevue, WA (US); Yi Lu, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 1078 days.

(21) Appl. No.: 11/599,260

(22) Filed: Nov. 10, 2006

(65) Prior Publication Data

US 2008/0086760 A1    Apr. 10, 2008

Related U.S. Application Data

(60) Provisional application No. 60/849,572, filed on Oct. 5, 2006.

(51) Int. Cl.
*H04L 29/06* (2006.01)
(52) U.S. Cl. ............................................. 726/7; 380/270
(58) Field of Classification Search .................. 726/3, 4, 726/5, 7, 17, 19, 21, 29, 10; 713/168, 173, 713/185, 156, 153
See application file for complete search history.

(56) References Cited

U.S. PATENT DOCUMENTS

| | | | |
|---|---|---|---|
| 5,689,642 A | 11/1997 | Harkins et al. | |
| 5,832,222 A | 11/1998 | Dziadosz et al. | |
| 5,912,888 A | 6/1999 | Walsh et al. | |
| 6,031,904 A | 2/2000 | An et al. | |
| 6,396,841 B1 | 5/2002 | Co et al. | |
| 6,439,464 B1 | 8/2002 | Fruhauf et al. | |
| 6,449,644 B1 | 9/2002 | Håål et al. | |
| 6,542,515 B1 | 4/2003 | Kumar et al. | |
| 6,567,860 B1 | 5/2003 | Maxwell et al. | |
| 6,618,393 B1 | 9/2003 | Chiles et al. | |
| 6,693,888 B2 | 2/2004 | Cafarelli et al. | |
| 6,768,721 B1 | 7/2004 | Schmitz et al. | |
| 6,941,405 B2 | 9/2005 | Morrow | |
| 7,016,948 B1 | 3/2006 | Yildiz | |
| 7,116,679 B1 | 10/2006 | Ghahremani | |
| 7,280,529 B1 | 10/2007 | Black et al. | |
| 7,477,632 B1 * | 1/2009 | Radhakrishnan et al. | .... 370/338 |
| 2001/0033556 A1 | 10/2001 | Krishnamurthy et al. | |

(Continued)

FOREIGN PATENT DOCUMENTS

EP    0994607    4/2000

(Continued)

OTHER PUBLICATIONS

Intel Corporation, "Enterprise Grade Wireless LAN Client, Intel® PROSet/Wireless Software 9.0", White paper, 2004, 10 pages.

(Continued)

*Primary Examiner* — Gilberto Barron, Jr.
*Assistant Examiner* — Izunna Okeke

(57) ABSTRACT

A computer system that can configure itself to establish a network connection. Configuration is performed by identifying a connection profile with information from a combination of sources. Information may be obtained from user input, network traffic monitoring and a discovery process involving attempts to establish a connection with different profiles. The computer system may perform the configuration process under the control of software that performs an automated configuration process is adapted to receive extensions for operation on computers with hardware components that have non-standardized configuration options. Extensions for networks operating according to non-standardized security protocol extensions are also possible.

20 Claims, 6 Drawing Sheets

U.S. PATENT DOCUMENTS

| | | |
|---|---|---|
| 2002/0022483 A1 | 2/2002 | Thompson et al. |
| 2002/0061748 A1 | 5/2002 | Nakakita et al. |
| 2002/0112039 A1 | 8/2002 | Ullman |
| 2002/0147820 A1 | 10/2002 | Yokote |
| 2002/0156922 A1 | 10/2002 | Chan et al. |
| 2002/0157007 A1 | 10/2002 | Sashihara |
| 2002/0159407 A1 | 10/2002 | Carrafiello et al. |
| 2002/0174335 A1 | 11/2002 | Zhang et al. |
| 2003/0005279 A1 | 1/2003 | Valenci et al. |
| 2003/0037237 A1 | 2/2003 | Abgrall et al. |
| 2003/0158906 A1 | 8/2003 | Hayes |
| 2003/0162556 A1 | 8/2003 | Libes |
| 2003/0210700 A1 | 11/2003 | Chen |
| 2004/0019786 A1 | 1/2004 | Zorn et al. |
| 2004/0030746 A1 | 2/2004 | Kavacheri et al. |
| 2004/0139201 A1 | 7/2004 | Chaudhary et al. |
| 2004/0198319 A1 | 10/2004 | Whelan et al. |
| 2004/0203593 A1 | 10/2004 | Whelan et al. |
| 2005/0102529 A1 | 5/2005 | Buddhikot et al. |
| 2005/0135315 A1 | 6/2005 | Sinha |
| 2005/0149626 A1 | 7/2005 | Manchester et al. |
| 2005/0152305 A1 | 7/2005 | Ji et al. |
| 2005/0260996 A1* | 11/2005 | Groenendaal ................. 455/445 |
| 2006/0007901 A1 | 1/2006 | Roskowski et al. |
| 2006/0023642 A1 | 2/2006 | Roskowski et al. |
| 2006/0209768 A1 | 9/2006 | Yan et al. |
| 2006/0209773 A1 | 9/2006 | Hundal et al. |
| 2006/0233191 A1 | 10/2006 | Pirzada et al. |
| 2006/0264227 A1* | 11/2006 | Takahashi et al. ............ 455/513 |
| 2007/0061394 A1 | 3/2007 | Frid-Nielsen et al. |
| 2007/0123253 A1 | 5/2007 | Simongini et al. |
| 2007/0140188 A1* | 6/2007 | Melkote et al. ................ 370/338 |
| 2007/0220005 A1 | 9/2007 | Castro Castro et al. |
| 2007/0226775 A1 | 9/2007 | Andreasen et al. |
| 2007/0294382 A1 | 12/2007 | Fujii et al. |
| 2008/0031238 A1 | 2/2008 | Harmelin et al. |
| 2008/0034071 A1 | 2/2008 | Wilkinson et al. |
| 2008/0037490 A1 | 2/2008 | Hughes et al. |
| 2008/0077638 A1 | 3/2008 | Monk et al. |
| 2008/0079986 A1 | 4/2008 | Ferlitsch |
| 2008/0228870 A1 | 9/2008 | Schweier |

FOREIGN PATENT DOCUMENTS

| | | |
|---|---|---|
| EP | 1134935 | 9/2001 |
| EP | 1178644 | 2/2002 |
| EP | 1227692 | 7/2002 |
| EP | 1401180 | 3/2004 |
| WO | WO 0241587 | 5/2002 |
| WO | WO 02089339 | 11/2002 |

OTHER PUBLICATIONS

Intel Corporation, "Managing Wireless Clients with the Administrator Tool, Intel® PROSet/Wireless Software 10.1", White paper, 2006, 15 pages.

Part 11: Wireless LAN Medium Access Control (MAC) and Physical Layer (PHY) specifications: Higher-Speed Physical layer Extension in the 2.4 GHz Band, IEEE Std 802. 11b-1999, Approved Sep. 16, 1999, 89 pages.

Part 11: Wireless LAN Medium Access control (MAC) and Physical Layer (PHY) specifications: High-Speed Physical layer in the 5 Ghz Band, IEEE Std 802.11a-1999, approved Sep. 16, 1999, 83 pages.

Geier, Jim, "802.11 Beacons Revealed", Oct. 31, 2002, Jupitermedia Corporation.

Office Action, U.S. Appl. No. 10/306,169, May 16, 2006.
Office Action, U.S. Appl. No. 10/306,169, Mar. 21, 2007.
Office Action, U.S. Appl. No. 10/306,169, Sep. 18, 2008.
Office Action, U.S. Appl. No. 10/306,169, May 6, 2009.
Office Action, U.S. Appl. No. 11/599,126, Jul. 6, 2009.
Office Action, U.S. Appl. No. 11/601,088 Sep. 4, 2009.
Office Action, U.S. Appl. No. 11/599,260, Dec. 2, 2009.
Office Action, U.S. Appl. No. 11/599,126, Dec. 8, 2009.
Office Action, U.S. Appl. No. 11/601,088, Mar. 5, 2010.

* cited by examiner

EXTENSIBLE NETWORK DISCOVERY

CROSS REFERENCE TO RELATED APPLICATIONS

This application claims the benefit under 35 U.S.C. §120 of U.S. Provisional Application Ser. No. 60/849,572, entitled "EXTENSIBLE NETWORK DISCOVERY," filed on Oct. 5, 2006, which is herein incorporated by reference in its entirety.

BACKGROUND

For a computer to connect to a network as a client, the computer must be configured with security settings that are compatible with security settings of a network access point and the backend network infrastructure. In addition, as part of the authentication process that a computer must complete to gain access to a network, the computer may be required to provide user credential data, such as a user name and password.

Some computers are configured to store a network profile that contains information needed to connect to a network. This information may be input by a user as part of a process of creating the network profile. To create the profile, a user must have information about the supported configuration of the access point through which the user will connect to the network and authentication mechanisms used in the backend network infrastructure. Frequently, a typical computer user will not have the required information or will not understand details of the network well enough to provide the required information to create a profile.

Creating a profile for a wireless network poses particular challenges because of the range of possible settings required to access the network. For example, there are many protocols available for wireless network security and a user may not know which profiles are in use for the network and therefore may not know which settings to specify as part of the profile.

For example, some wireless networks require IEEE 802.1X authentication. Further, the IEEE 802.1X authentication protocol incorporates an extensible authentication protocol (EAP) that allows a network to be configured to require client computers connecting to the network to authenticate using a method beyond those specified in the standardized IEEE 802.1X protocol. Because the IEEE 802.1X protocol is extensible, there may be variations in the required settings needed to connect to different networks that implement different extensions of the IEEE 802.1X protocol.

As an example of further variations, some networks may authenticate clients using a WPA2 protocol. The WPA2 protocol also includes variations, including an enterprise variation and a personal variation. Further, when configuring a network to operate under the WPA2 protocol, different types of encryption ciphers may be required. For example, TKIP or CCMP encryption ciphers may be used. As another example, a WPA protocol may be used for authentication. Like the WPA2 protocol, the WPA protocol has an enterprise and a personal variant, each of which may use either a TKIP or a CCMP encryption cipher. The enterprise variants of these protocols are used with 802.1X authentication, but the personal versions are not.

Further difficulties in setting a profile may arise because the defined profile must also be compatible with the hardware and software of the computer. For example, a network may support an authentication/cipher that the hardware of the computer hardware is not able to support. Creating a profile that matches such a network will result in a failed connection. A similar problem can arise with software configuration. A network backend may support multiple EAP methods, such as EAP-TLS, EAP-PEAP and EAP-FAST. Creating a profile with one of these methods, even though the network supports the method, will also result in a failed connection if the client computer does not support the same method.

Some of the information needed to create a connection profile may be available to a client computer from the network itself. In a wireless network, an access point traditionally transmits a beacon, which is a signal that contains information used by a client in connecting to the access point. The beacon may provide a client with some information about the security configuration of the network, which may be used to configure security settings. However, a beacon does not provide all information needed to configure a computer seeking to connect to a network.

SUMMARY OF INVENTION

To simplify establishing connections between a computer and a network, the computer may automatically identify a required configuration. The computer may identify a configuration using information supplied by a user, information obtained from monitoring network communications, information obtained by querying a hardware or software configuration and/or information discovered by attempting to connect to the network. To provide a low burden on the user, information obtained from the user may be limited to that which cannot be discovered, such as the name of the network to which connection is desired and a user name and password or other credential information.

Information about connectivity and security settings not obtained from the access point may be discovered by attempting to establish a connection using different settings. Connection attempts may be made until a combination of settings that allows a connection is identified. To reduce the time spent performing this discovery, combinations of settings may be established and prioritized, with the highest priority combinations being tried first. Prioritization may be based on the level of security provided by that combination of settings, with the most secure combinations being tried first. In some embodiments, results of prior connection attempts may be used to dynamically alter the selection of combinations to try.

The automated configuration process may be implemented in a widely available operating system or other general software. Such software may be based on standardized computer hardware settings and network configurations. Such elements may be standardized as a result of a formal standard setting process or may be de facto standards arising from widespread use. To allow the discovery process to operate with networks that use extensions of a standardized protocol or to operate on computers that incorporate hardware that supports non-standardized connectivity settings, the software that performs the discovery process may be constructed with interfaces to modules that can either perform methods of authentication that may be used to extend a standardized network or to interface with modules provided with hardware components that may support connectivity settings beyond those used in standardized configurations.

The foregoing is a non-limiting summary of the invention, which is defined by the attached claims.

BRIEF DESCRIPTION OF DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings.

DETAILED DESCRIPTION

Figure 1:
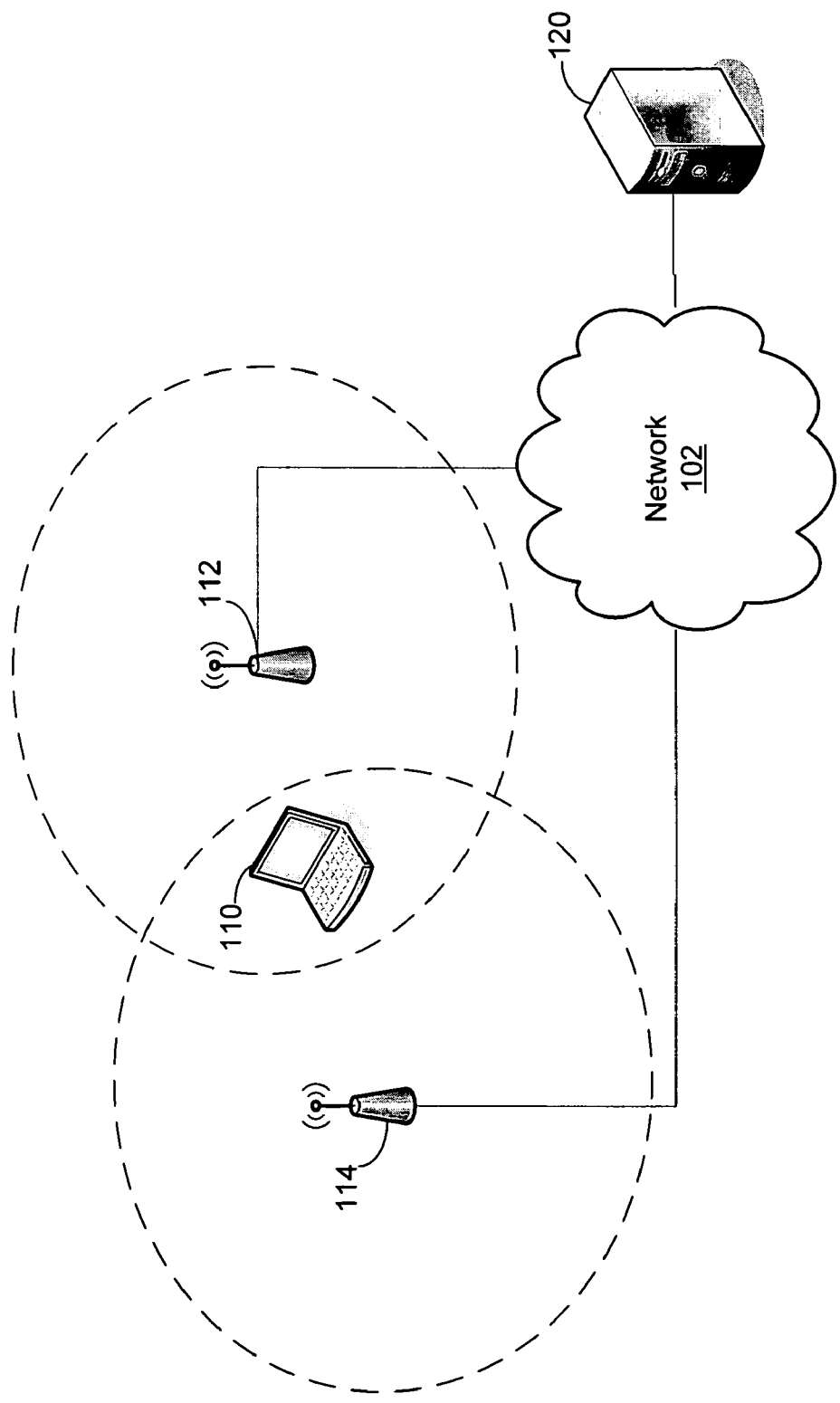
FIG. 1 is a sketch of a network configuration according to an embodiment of the invention.

A computer user's experience in connecting the computer to a network as a client can be improved by equipping the computer with software to automatically configure the computer with connection settings. The software may obtain information from multiple sources to determine a network configuration for connection to the network. Information may be obtained from monitoring network communications, such as those transmitted by an access point. Other information may be obtained by attempting a connection using combinations of settings to discover a combination of settings that enables a connection. Other information may be obtained from the user. To reduce burden on the user, the information obtained from the user may be limited to information that is not discoverable. For example, an identification of the network to which connection is to be established and credential information may not be discoverable and may be provided by user input.

Software for automated configuration may be provided as part of the operating system of the client computer. Such software may be configured to attempt connection using settings that are possible variations for networks using standardized protocols and settings for computers using standardized hardware. To allow the automated configuration process to function on networks that use extensions of standardized protocols or on computers that have non-standardized configuration options, the software for automated configuration may be extensible in one or more ways.

The software may be extensible to accept modules that provide non-standardized information or perform non-standardized authentication methods. For example, the automated configuration software may be extensible to attempt connections using extensions of a standardized security protocol. In some embodiments, extensibility is provided through an interface to modules performing EAP methods. However, any suitable extensibility mechanism may be used.

Additionally, the automated configuration software may be extensible to receive modules providing information about available configuration settings on non-standardized hardware components. In some embodiments, extensibility is provided through an interface in the software to modules provided by a vendor of the hardware components. Such modules may run as part of applications that configure or access the hardware components. However, any suitable mechanism may be used to provide extensibility for non-standardized hardware components.

To reduce the time taken for discovery and to simplify choices for the user, connections may be attempted using combinations of settings that have been prioritized in order of the desirability of establishing a connection using that combination of settings. For example, different protocols, and different variations of the same protocol, provide varying levels of security. The combinations may be applied in order of the level of security, attempting connections that provide the highest level of security first. In this way, the automated discovery process results in selection of the combination of settings that provides the highest security available. However, any suitable criteria may be used to prioritize combinations of settings.

FIG. 1 illustrates a scenario in which automatic configuration may be used according to an embodiment of the invention. In the example of FIG. 1, computer 110 may seek to connect to a network 102 as a client. In the embodiment illustrated, computer 110 may seek to establish a wireless connection to network 102. However, the invention is not limited for use in establishing wireless connections.

As illustrated in FIG. 1, computer 110 is in proximity to two access points to network 102, access point 112 and access point 114. Computer 110 is configured with a wireless network interface card that exchanges signals with access points in range. In the configuration illustrated in FIG. 1, computer 110 is in range of both access points 112 and 114. Because computer 110 is in range of multiple access points, computer 110 may establish a connection to network 102 through either access point.

When a network is configured, it is not necessary that all access points have the same configuration settings. Accordingly, computer 110 may require a different configuration to connect to network 102 through access point 112 than if attempting to connect to network 102 through access point 114. For example, FIG. 1 could illustrate a scenario in which a company or other enterprise operates a wireless network with different types of access for its employees and its guests. Access point 112 may represent an access point for employees having appropriate security credentials to gain access to much of the information and resources available over network 102, which may be an enterprise WAN containing servers, such as server 120, storing company confidential data. Conversely, access point 114 may be maintained by the enterprise for guest access. Guests of the company may access network 102 through access point 114 for a limited set of purposes. For example, if computer 110 connects to network 102 through access point 114 as a network guest, a user of computer 110 may be able to access a public web server connected to network 102 or access the Internet through network 102. However, if computer 110 obtains guest access through access point 114, other information and resources available through network 102 may be unavailable to the user of computer 110.

For computer 110 to gain access to network resources through access point 112, computer 110 must be configured to establish a connection through access point 112 and must also be appropriately configured to obtain access to backend network resources, such as server 120.

FIG. 1 is a simplified illustration of a network configuration. However, it demonstrates operation of automatic configuration according to some embodiments of the invention. To appropriately configure computer 110 as a network client, it would be necessary for a user of computer 110 to know any settings of the hardware and software within computer 110 necessary to make a connection to the desired access point. In addition, the user of computer 110 would additionally need to know any security settings on computer 110 necessary to communicate with the desired access point. The specific settings may depend on the hardware installed on computer 110. The specific settings also may depend on the specific access point to which computer 110 connects to the network. Additionally, the user of computer 110 would be required to know any security settings necessary to gain access to the backend network infrastructure, such as server 120. By programming computer 110 to automatically configure itself for access to a desired network, the need for a user to supply the required configuration settings is greatly diminished, which can greatly improve the user's experience in using network 102.

Figure 2:
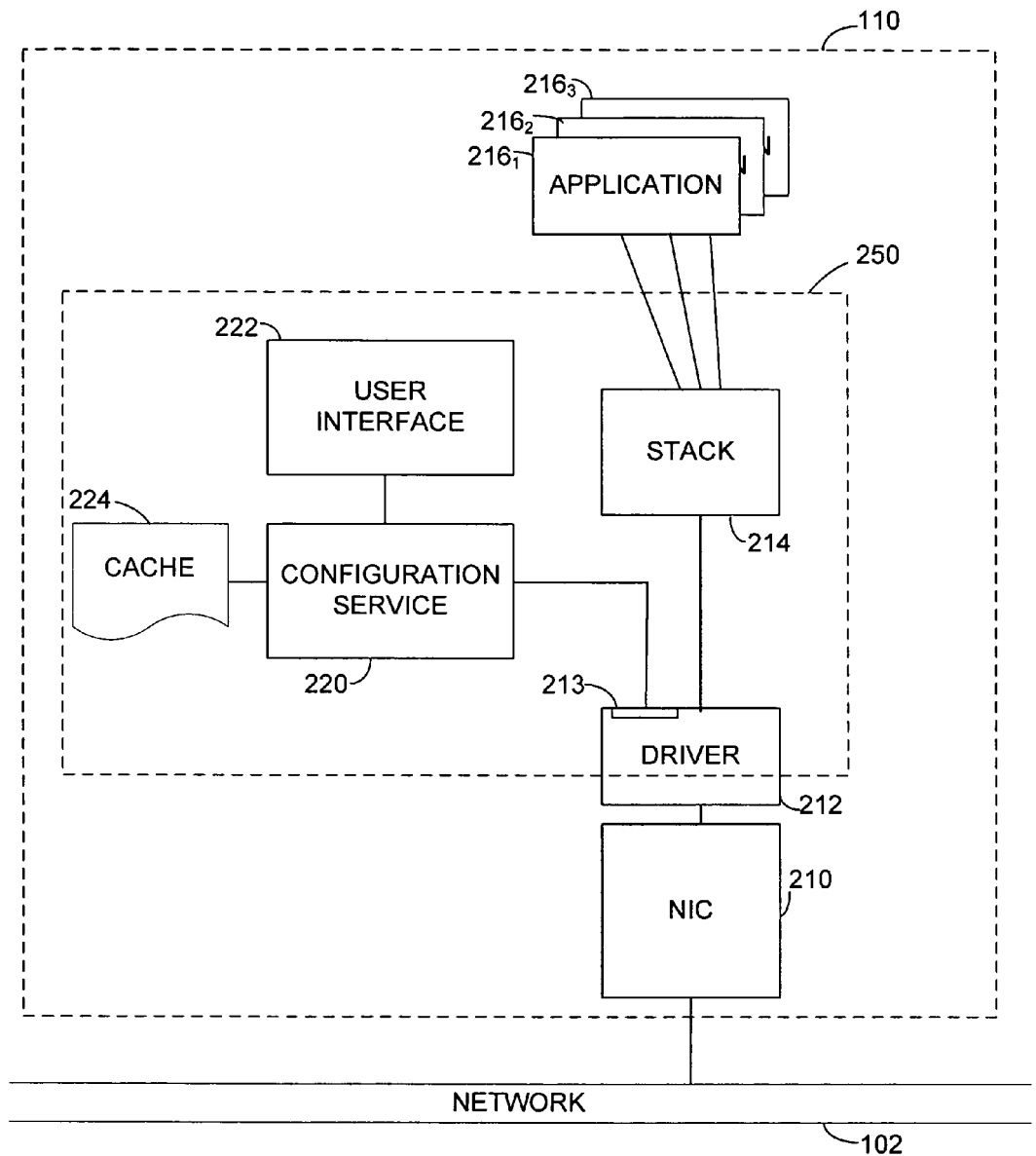
FIG. 2 is a block diagram of an architecture of portions of a client computer according to an embodiment of the invention.

FIG. 2 illustrates an embodiment in which software for automatic configuration may be incorporated into computer 110. In the embodiment illustrated in FIG. 2, computer 110 includes a network interface card 210 that establishes a physical link to network 102. Network interface card 210 may be a conventional network interface card or implemented in any other suitable fashion. In the embodiment of FIG. 1, the physical link is established wirelessly through an access point, such as access point 112 or 114. However, the physical link may be established through a copper wire, fiber optic cable or any other suitable medium.

Computer 110 contains driver 212 that acts as an interface between network interface card 210 and other software components within computer 110. Driver 212 may be any suitable driver. For example, a suitable driver is described in currently pending U.S. patent application Ser. No. 10/306,169, published as US2004-0103278A1, which is hereby incorporated by reference in its entirety. Such a driver provides an interface to networking components used to facilitate communications for applications such as applications $216_1$, $216_2$ and $216_3$. In the example illustrated, driver 212 provides an interface to stack 214, which in turn provides a mechanism for applications to communicate over network 102. Stack 214 may be implemented as a conventional stack or may be implemented in any other suitable way.

Driver 212 additionally provides a mechanism for services installed on computer 110 to communicate over network 102 separately from the mechanisms used by applications such as applications $216_1$, $216_2$ and $216_3$. In the specific example, driver 212 is implemented in two portions. One portion is within operating system 250 and a second portion is outside operating system 250. Operating system 250 may be any suitable operating system for computer 110 and may include utilities and services, such as an automated configuration service. In the specific example illustrated, the portion of driver 212 outside of operating system 250 may be provided by a vendor supplying the hardware for network interface card 210. The portion of driver 212 outside of operating system 250 may provide hardware specific control of network interface card 210. The portions of driver 212 within operating system 250 may provide a conventional interface to stack 214, allowing data transmitted over network 102 to be exchanged with applications such as $216_1$, $216_2$ and $216_3$. In addition, the portions of driver 212 within operating system 250 may have access to management and control packets used for communications over network 102. As a result, driver 212 may provide a range of information concerning communications over network 102 to services within operating system 250. This information may be provided in any suitable way. In the specific example, driver 212 may include interface 213, which may be in a form that is sometimes referred to as a server.

In the example of FIG. 2, automated configuration service 220 interacts with driver 212 through interface 213. As a result, automated configuration service 220 may generate and receive information relating to transmissions over network 102 by interacting with driver 212 to control network interface card 210.

Automated configuration service 220 uses this ability to obtain information about required settings for a connection to network 102. Such information may be obtained by analyzing transmissions on network 102. As a specific example, in a wireless network, an access point may transmit a beacon that includes some information about security configuration of that access point. Because network interface card 210 can receive beacon signals and driver 212 has access to the information received by network interface card 210, automated configuration service 220 may access information received by computer 110 in a beacon signal through interface 213. Additionally, configuration service 220 may use its interface to driver 212 to specify settings for an attempted connection between computer 110 and an access point on network 102. Automated configuration service 220 may also receive information about responses received by network 210 that indicates the result of an attempt to connect to network 102. In this way, automated configuration service 220 may discover information about the required settings for a connection to network 102.

To obtain additional information about configuration settings, automated configuration service 220 may obtain information from a user through user interface 222. In a conventional computer, user interface 222 may display a window on a screen of computer 110, prompting a user to enter certain types of information. However, the specific form in which user interface 222 requests and receives information from a user is not a limitation of the invention, and any suitable form of interface device may be used.

Once automated configuration service 220 obtains information about a configuration, that information may be stored in a cache 224. In the illustrated embodiment, cache 224 stores information in an encrypted fashion. The information stored in cache 224 may represent a connection profile, including security settings, hardware settings, user credentials or any other suitable information. When a user indicates through user interface 222 that a connection to network 102 is desired, automated configuration service 220 may determine whether a profile for that connection is stored in cache 224. If a profile has been previously stored, automated configuration service 220 may retrieve that profile from cache 224 for use in configuring computer 110 to make that connection. If no profile is stored for a desired connection, automated configuration service 220 may attempt to discover a profile.

In addition, cache 224 temporarily may store information used during the network setting discovery process. For example, credential information provided by a user through user interface 222 may be encrypted and stored in cache 224. If a user elects not to save a profile that has been automatically discovered, or if no connection is discovered, this temporary information may be deleted.

Figure 3:
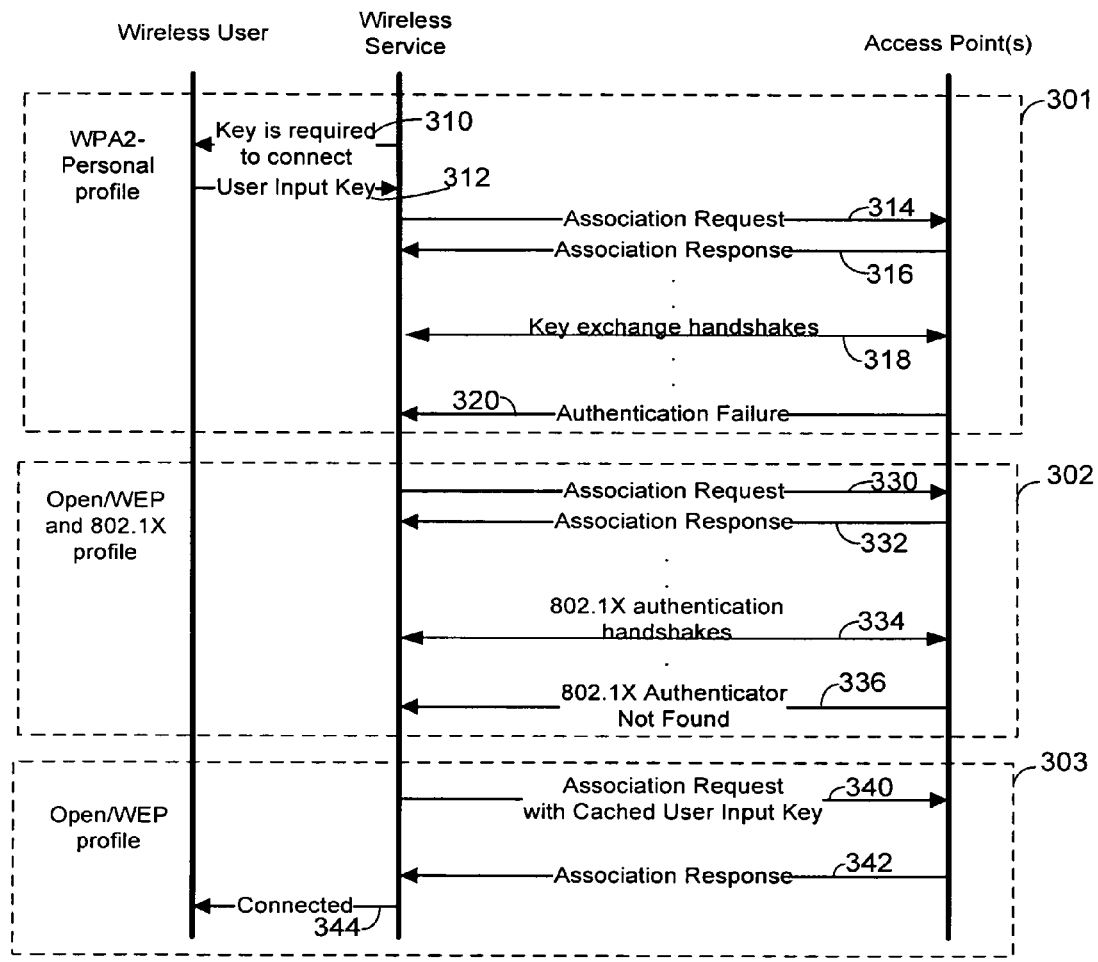
FIG. 3 is a diagram illustrating interactions during network discovery according to an embodiment of the invention.

Because the architecture of FIG. 2 allows automated configuration service 220 access to information on network communications, automated configuration service 220 may discover an appropriate combination of settings to establish a profile for connection to network 102. FIG. 3 illustrates a process by which that discovery may occur.

The process of FIG. 3 is performed by automated configuration service 220 (FIG. 2) after it has obtained some information on the connection to be established. Any type or amount of information may initially be obtained in any suitable way. In the example of FIG. 3, prior to performing the process illustrated, automated configuration service 220 has obtained information from a user and has extracted information from a network beacon received at network interface card 210. The information obtained from the network beacon and from the user identifies a network and provides preliminary information on the security settings needed to connect to the network. As a specific example, automated configuration service 220 may obtain through driver 212 information indicating that the service set identifier (SSID) transmitted in a beacon is compatible with only three security protocols, which are illustrated in FIG. 3 as WPA2-Personal, open/WEP with 802.1X and open/WEP. Automated configuration service 220 may then create three candidate profiles, each corresponding to settings necessary to configure computer 110 to connect to the network if it is using one of the three possible security protocols. These candidate profiles may be created and stored in any suitable way. As an example, automated configuration service 220 may store the candidate profiles in cache 224 in much the same way that it would store a selected profile upon completion of the automated configuration process.

Once the candidate profiles are completed, automated configuration service 220 may apply each profile in turn and attempt to establish a connection with computer 110 configured with that profile. Automated configuration service 220 may apply each profile through the interface 213 to driver 212.

FIG. 3 illustrates three subprocesses 301, 302 and 303. Each subprocess involves an attempt to establish a connection using a different candidate profile. Subprocess 301 is performed using a WPA2-Personal candidate profile. Subprocess 302 is performed using an open/WEP with 802.1X candidate profile. Subprocess 303 is performed using an open/WEP candidate profile.

Subprocess 301 begins with a wireless service, of which automated configuration service 220 is a part, recognizing that connection using the WPA2-Personal security settings requires a key. Accordingly, at interaction 310, automated configuration service 220 uses user interface 222 to request a user to input a key. Interaction 312 indicates a user providing the key information through user interface 222. More generally, interactions 310 and 312 indicate that automated configuration service 220 may obtain credential information from a user in conjunction with any candidate profile that requires such credential information be supplied.

The process continues with interaction 314. At interaction 314, automated configuration service 220 interacts through driver 212 to cause network interface card 210 to transmit network frames in a format indicating that client 110 is requesting an association. Interaction 316 indicates a response from an access point to association request 314.

The exchange of association request 314 and association response 316 then triggers a series of key exchange interactions 318. The key exchange interactions 318 are performed, from the perspective of client computer 110, as if the access point is communicating with the WPA2-Personal security protocol using the key supplied by the user at interaction 312. If the access point is not actually configured for this protocol, an attempt to connect to the access point will eventually fail. This failure is indicated at interaction 320. In the embodiment illustrated, the attempt to connect in subprocess 301 fails following key exchange interaction 318. However, if the access point is not configured for the security protocol in the candidate profile used in subprocess 301, authentication failure could occur at any time during subprocess 301.

Once the attempt to connect in subprocess 301 fails, automated configuration service 220 selects a second candidate profile and attempts a connection in subprocess 302. In the embodiment of FIG. 3, subprocess 302 is performed using a candidate profile created assuming the access point is configured for open/WEP and 802.1X. Automated configuration service 220 therefore applies the appropriate settings through interface 213 and initiates an attempt to establish a connection.

Subprocess 302 begins with interaction 330 in which client computer 110 sends an association request to the access point. At interaction 332, the access point responds. The interactions 330 and 332 trigger an attempt to authenticate computer 110 as a client of the network to which connection is sought. A series of 802.1X authentication handshakes may be performed at interactions 334. If interactions 334 require a key, the key obtained from the user at interaction 312 may be used. Though not expressly shown, if the authentication interactions 334 require additional user credentials or other user information, the user may be prompted to provide the required information as part of subprocess 302.

If the network is not configured for access using the open/WEP and 802.1X security protocol, the attempt to connect in subprocess 302 will eventually fail. In the example of FIG. 3, failure is indicated at interaction 336 when an 802.1X "authenticator not found" status message is transmitted from the access point to client 110. However, the specific manner in which a communication attempt may fail may depend on the configuration of the access point or other components of the network.

Regardless of how the attempted communication fails, automated configuration service 220 may then select a further candidate profile to configure client 110 and make a further attempt to connect to the network. In the example of FIG. 3, an open/WEP candidate profile is used in subprocess 303. Subprocess 303 begins with interaction 340 at which an association request is transmitted from client computer 110 to the access point.

In this example, interaction 340 includes transmission of a key. The key transmitted at interaction 340 may be obtained from the information provided by the user at interaction 312. That key information may be cached, such as in cache 224 (FIG. 2) when it is received at interaction 312 for use in connection with any other candidate profile that may require key information.

In the example of FIG. 3, the network to which the computer 110 is attempting to connect is configured for the open/WEP security protocol. Accordingly, when a candidate profile developed for open/WEP protocol is applied in subprocess 303, the result is an association response from the access point at interaction 342. Interaction 342 indicates that a connection has been established. The wireless service of which automated configuration service 220 is a part notifies the user at interaction 344 that a connection has been established.

Interaction 344 may be implemented in any suitable way, including as in a computer with a conventional wireless service. For example, automated configuration service 220 may provide through user interface 222 information to be displayed in a dialog box on a display screen computer 110. Alternatively, interaction 344 may be performed by changing color, shape or other attribute of a status indicator displayed on a computer screen. However, interaction 344 need not involve the visual display information. For example, a sound or other user perceptible indication may be used to implement interaction 344.

In the embodiment illustrated, three candidate profiles were applied before one resulted in a successful connection. Possible candidate profiles were created prior to initiation of connection attempts. The number of profiles created may depend on the number of possible variations of configuration settings for computer 110. If information obtained from monitoring network transmissions or other available sources can eliminate some possible configuration settings, the total number of candidate profiles may be reduced.

Table I provides an example of candidate profiles that may be generated based on security settings detected by analyzing information in a beacon frame received from an access point on a wireless network. For example, the first row of Table I indicates that if detected security settings indicate that a network is configured for WPA2-Enterprise security using TKIP/CCMP encryption cipher, three candidate profiles may be generated. Those candidate profiles are WPA2-Enterprise with TKIP/CCMP, 802.1X and EAP-PEAP. The second candidate profile uses WPA2-Enterprise settings with TKIP/CCMP encryption cipher and 802.1X with EAP-TLS extension. The third candidate profile indicated in the first row of Table I indicates that settings for WPA2-Enterprise with TKIP/CCMP encryption cipher and 802.1X authentication with an extension in the form of EAP-FOO where EAP-FOO belongs to S_EAP. S_EAP may be a family of protocol extensions that computer 110 is programmed to recognize. Accordingly, the third candidate profile listed in the first row may actually represent a family of candidate profiles, each using a different available extension according to the EAP.

Each of the other rows in Table I indicates a set of profiles that may be created based on detected security settings.

TABLE I

| Detected Security Setting | Candidate Profiles |
| --- | --- |
| WPA2-Enterprise, TKIP/CCMP | WPA2-Enterprise, TKIP/CCMP, and 802.1X, EAP-PEAP |
| | WPA2-Enterprise, TKIP/CCMP, and 802.1X, EAP-TLS |
| | WPA2-Enterprise, TKIP/CCMP, and 802.1X, EAP-FOO where EAP-FOO belongs to S_EAP |
| WPA2-Personal, TKIP/CCMP | WPA2-Personal, TKIP/CCMP, no 802.1X |
| WPA-Enterprise, TKIP/CCMP | WPA-Enterprise, TKIP/CCMP, and 802.1X, EAP-PEAP |
| | WPA-Enterprise, TKIP/CCMP, and 802.1X, EAP-TLS |
| | WPA2-Enterprise, TKIP/CCMP, and 802.1X, EAP-FOO where EAP-FOO belongs to S_EAP |
| WPA-Personal, TKIP/CCMP | WPA-Personal, TKIP/CCMP, no 802.1X |
| Open, WEP, no 802.1X in WPSIE | Open, WEP, no 802.1X |
| Open, WEP, no WPA/WPA2, no WPSIE | Open, WEP, and 802.1X, EAP-TLS |
| | Open, WEP, and 802.1X, EAP-PEAP |
| | Open, WEP, no 802.1X |
| Open, No encryption | Open, No encryption |

FIG. 3 illustrates that once a successful connection is established, no further attempts at connection are made regardless of the number of remaining candidate profiles. In some embodiments, it may be desirable to attempt a connection using all available candidate profiles and select the best profile from all those that resulted in successful connections. Such an embodiment is useful in an embodiment such as is illustrated in FIG. 1 in which a computer may connect through more than one access point with different security settings at different access points.

Any suitable criteria may be used for selecting the best candidate profile. In some embodiments the best profile is selected to provide the highest level of security. As one example, the following profiles may be deemed to provide levels of security in the order listed, from highest security to lowest security: WPA2, WPA, WEP and None. Each of these security protocols may further have levels. For example, a variation of a protocol using 802.1X authentication may be deemed to provide higher security than a variation of the same protocol that does not use 802.1X authentication. Likewise, enterprise variations may be deemed to provide higher levels of security than personal variations of the same protocol. However, the specific criteria used to rank security settings is not a limitation on the invention, and any suitable order may be used in embodiments in which a best or preferred configuration is defined.

Also, it is not necessary that all of the candidate profiles be applied before selecting the best candidate profile. In some embodiments, the candidate profiles may be ordered according to any suitable method for defining best candidate profiles, and attempts to connect using candidate profiles may be applied in that order. In such embodiments, once a connection is established with any candidate profile, that candidate profile can be identified as the best candidate profile without the need for attempting connection with any further candidate profiles.

Figure 4:
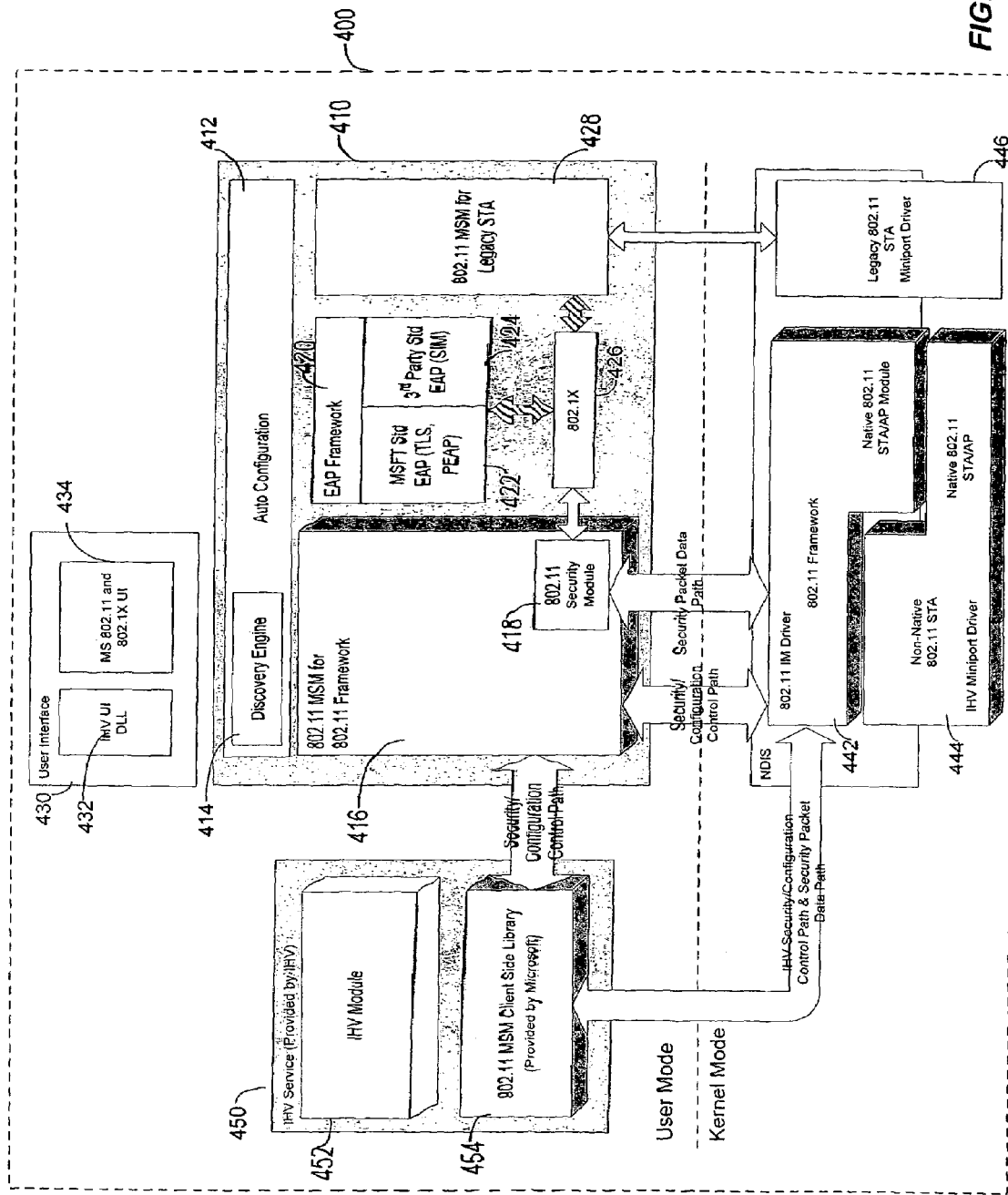
FIG. 4 is a more detailed block diagram of a client computer configured for extensible network discovery according to an alternative embodiment of the invention.

FIG. 4 illustrates a software block diagram of an alternative embodiment of the invention. In the embodiment illustrated in FIG. 4, the automated configuration is extensible. The automated configuration service may be extensible in one or more ways. In the embodiment illustrated, the automated configuration service may be extended to identify a configuration based on an extension of a security protocol. In addition, the automated configuration service is extensible to develop a profile that configures hardware within the computer with non-standardized settings. In the illustrated embodiment, configuration for extensions of standardized security protocols may be achieved using modules in the EAP format according to RFC 3478, though any extension format may be used. Extensibility for non-standardized hardware settings may be provided through modules supplied by an independent hardware vendor (IHV), though any method of obtaining extensibility information may be used.

FIG. 4 illustrates a configuration service 410 that includes an automated configuration module 412. Automated configuration module 412 may perform the functions of automated configuration service 220 described above in connection with FIG. 2. Those functions include obtaining user information about a network to which a connection is desired and, in some instances, obtaining user credentials or other information. Auto-configuration module 412 may also gather information from monitored network communications and from attempted connections.

To manage the process of obtaining information about network settings through connection attempts, auto-configuration module 412 includes a discovery engine module 414. Discovery engine module 414 may perform discovery portions of the automated configuration process. Discovery engine module 414 may discover appropriate settings in any suitable way. In the pictured embodiment, discovery engine module 414 creates candidate profiles and attempts to establish a network connection using the candidate profiles. The candidate profile with which a connection is successfully established indicates required settings for a network connection.

As part of the discovery process, auto-configuration module 412 may interact with other modules. User information used for automatic configuration may be obtained through user interface module 430. User interface module 430 may control interactions with a user interface of any suitable form.

In the embodiment illustrated, user interface module 430 includes a standardized interface module 434 and an extension interface module 432. Standardized interface module 434 may present to a user requests for information used to establish a connection in a standardized protocol. In the specific example illustrated, standardized interface module 434 obtains from a user information used to establish a connection to a network using the 802.11 or 802.1X security protocols. However, standardized interface module 434 may be adapted to obtain information used to create a connection with a network operating according to any suitable security protocol. Further, in some embodiments, more than one standardized interface module may be included within user interface module 430.

Extension interface module 432 is adapted to obtain information from a user that can be used to create a profile to configure a computer with hardware that contains non-standardized configuration options. For example, extension interface module 432 may provide information to a user on the non-standardized configuration options of a hardware component and obtain input from the user on which of the non-standardized configuration options should be employed.

In the embodiment illustrated, user interface module 430 is configured to receive extension interface modules in the form of extension interface module 432. In some embodiments, no extension interface module will be incorporated into user interface module 430. However, in other embodiments, multiple extension interface modules may be employed.

As described above, automated configuration of a computer may involve analyzing messages transmitted over a network and attempting connection to a network by sending transmissions over a network and analyzing the response. Transmission and receipt of network communications is performed by a network interface card (not shown in FIG. 4) controlled by a driver. FIG. 4 shows a driver with two components. IM driver 442 and IHV mini-port driver 444 collectively form a driver.

In the embodiment illustrated, IM driver 442 may be a component of an operating system and IHV mini-port driver 444 may be provided by a hardware vendor in association with a network interface card. IHV mini-port driver 444 may be configured to control a specific hardware configuration of the network interface card, including any non-standardized configuration settings. IM driver 442 may be configured to provide an interface between IHV mini-port driver 444 and other software components. In the embodiment illustrated, IM driver 442 is configured to receive from IHV mini-port driver 444 information on frames received over a network and to specify the format of frames transmitted over a network. Accordingly, IM driver 442 provides a mechanism for software modules to obtain information used in an automated configuration process.

Information, including control information, may be shared between modules using framework 416. In the example illustrated, framework 416 is configured for exchanging information used for configuring a computer for wireless communication. Framework 416 provides a security and configuration control path to IM driver 442. Accordingly, auto-configuration module 412 may interact through framework 416 to configure drivers 442 and 444, and the network interface card to which they interface, through framework 416.

In the embodiment of FIG. 4, framework 416 includes a wireless security module 418, which is adapted to perform functions used by a computer to authenticate itself as a client according to the 802.11 security protocol. Security module 418 provides an interface to library 426. In the example in which framework 416 is configured for wireless communication according to the 802.1X protocol, library 426 contains methods that execute authentication functions according to the 802.1X protocol. In embodiments in which other security protocols are employed, framework 416 may contain different or additional security modules associated with those protocols and different or additional libraries containing methods to perform authentication according to those protocols.

In the embodiment illustrated, configuration service 410 is intended to provide a configuration even if extensions of the 802.1X protocol are in use. To accommodate extensions, configuration service 410 includes an extensibility framework 420. In this example, extensibility framework 420 is configured for the EAP extension. Framework 420 provides a mechanism for security module 418 to receive extension methods when it interacts with library 426, even though library 426 contains methods for the standardized aspects of the base protocol. When library 426 receives from security module 418 a request for authentication according to an extension, library module 426 may interact with framework 420 to obtain a method to perform authentication according to that extension.

In the embodiment illustrated, framework 420 provides access to two types of methods. Methods 422 may be provided in conjunction with the operating system of which configuration service 410 is a part. Methods such as TLS and PEAP, which are reasonably well known, may be provided as part of methods 422. Additionally, methods defined by third parties may also be incorporated in framework 420. In the example illustrated, methods 424 are provided by third parties.

Framework 416 also provides a mechanism to integrate information, including control information, for control of specific hardware components, such as a network interface card. In the example illustrated, framework 416 interfaces with IHV service 450. IHV service 450 contains modules that perform functions associated with the exchange of information with hardware components. In the embodiment illustrated, IHV service 450 contains library 454 of modules that perform functions on hardware components. The library 454 may perform well known or widely used functions. Library 454 may be provided in conjunction with an operating system including configuration service 410. Additionally, IHV service 450 includes an IHV module 452. IHV module 452 may be supplied in connection with a specific hardware component. In the embodiment illustrated, IHV module 452 contains methods that interact with that hardware component to perform non-standardized functions that cannot be performed by methods within library 454. In this way, auto-configuration module 412, interacting with IHV service 450 through framework 416, may both obtain information about the non-standardized hardware configuration options and control settings of that hardware to enable or disable the non-standardized hardware options.

In the pictured embodiment, IHV module 452 is added to the operating system containing configuration service 410 after the operating system is installed. The IHV module 452 may, for example, be added as a component of configuring the computer when it is initially assembled or may be added at a later time when a hardware component is added. If addition of a hardware component requires exchange of information with a user, extension interface module 432 may control that exchange of information. In the embodiment illustrated, extension interface module 432 is implemented as a DLL, allowing extension interface module 432 to be incorporated into the operating system at any suitable time.

FIG. 4 shows that configuration service 410 may be used in an operating system in conjunction with multiple other components, some of those components may provide information used as part of the automated configuration process. For example, legacy station module 428 may be included within configuration service 410 to provide functions associated with configuring a network interface card for communicating according to a legacy 802.11 wireless standard. In the embodiment illustrated, legacy station module 428 interfaces with legacy mini-port driver 446, which may control a network interface card (not shown). The network interface card controlled by legacy mini-port driver 446 may be the same or a different hardware component than the network interface card controlled by driver components 442 and 444.

Figure 5:
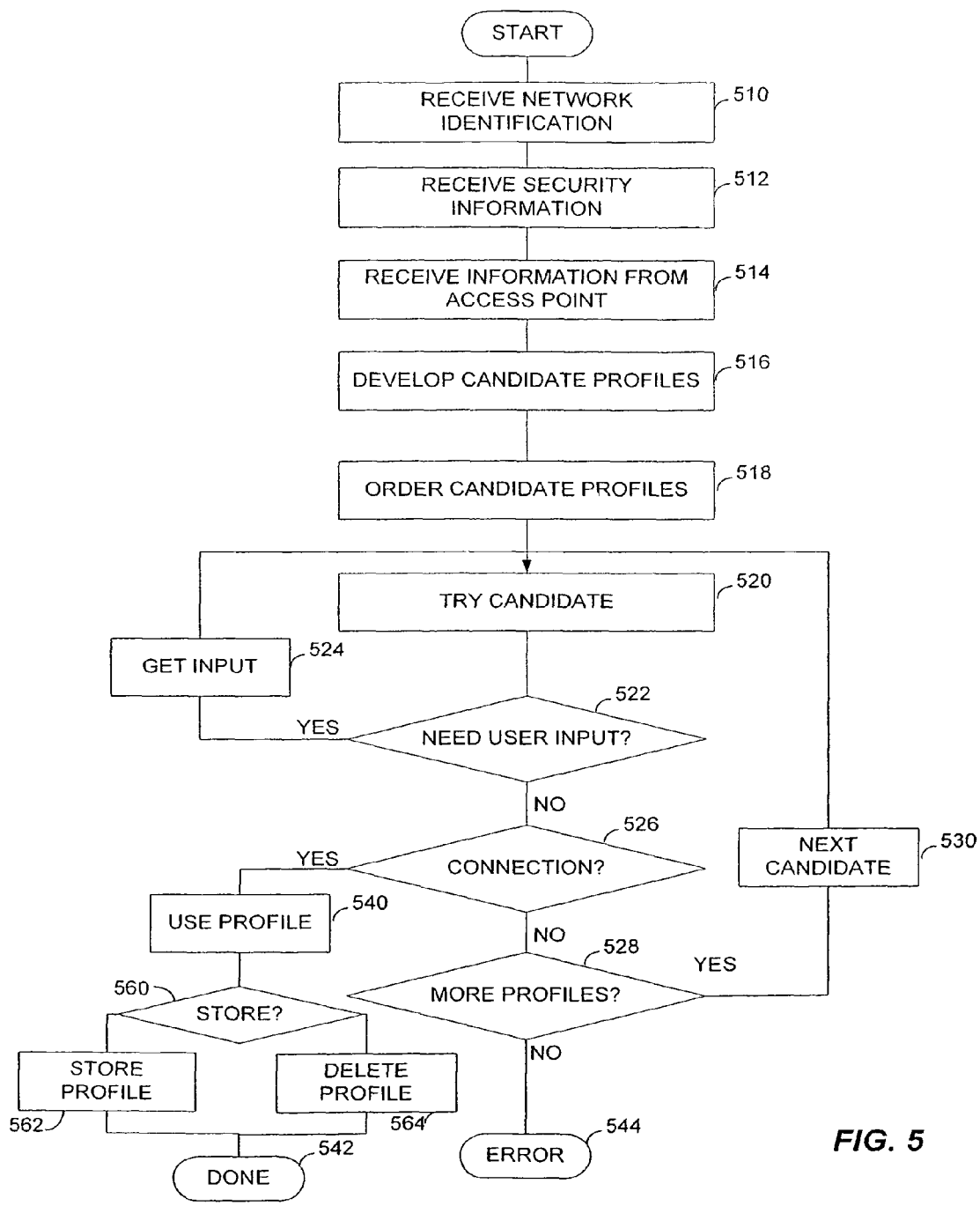
FIG. 5 is a flow chart of a process of network discovery according to an embodiment of the invention.

FIG. 5 illustrates a flow chart of a process by which a computer may be configured to connect to a network. The process of FIG. 5 may be performed in software executing on the computer attempting to connect to the network as a client, such as an automated configuration service that is a part of an operating system of a user computer. However, the process may be performed in any suitable way.

The process of FIG. 5 begins at block 510 where an identification of the network to which a connection is to be established is received. The network identification may be received in any suitable way. As one example, the network identification may be received as a result of user input entered through a window on a graphical user interface. However, the invention is not limited for use in connection with network identification information provided by a user. As one alternative, the network identification may be received from an application program executing on the computer.

The process then proceeds to block 512. At block 512 security information is received. The security information may be received at block 512 in any suitable way. For example, it may be entered by a user through a user interface. However, security information alternatively or additionally may be received at block 512 through a hardware security device such as a dongle or biometric scanner.

At block 514, information is received from an access point. In embodiments in which access points transmit beacons containing connection information, processing at block 514 may involve receiving and analyzing the contents of beacon frames. However, in alternative embodiments, processing at block 514 may involve receiving and analyzing other types of frames or packets transmitted over the network.

Regardless of how information on the network is obtained, at block 516, candidate profiles are developed. One or more candidate profiles may be developed to be consistent with the information obtained at blocks 510, 512 and 514. Candidate profiles to be developed may be identified by accessing a table, such as Table I, stored in computer-readable medium associated with the computer attempting to connect to the network.

Additionally, candidate profiles may be selected based in part on the hardware and software configuration of the computer on which the process is performed. If the computer cannot be configured to operate according to a specific profile, that profile may be omitted as a candidate. Information about the hardware and software configuration of the computer may be obtained in any suitable way, such as through the framework illustrated in FIG. 4. However, any suitable method may be used to identify and develop candidate profiles at block 516.

Once the candidate profiles are developed at block 516, they may be ordered at block 518. Ordering at block 518 may be performed in any suitable fashion. In some embodiments, candidate profiles may be ordered in accordance with a level of security afforded to communications using that profile. However, any suitable criteria may be used for ordering the data profiles.

At block 520, the highest priority candidate profile is used to attempt to establish a connection. Processing at block 520 may involve applying the settings from the candidate profile to the hardware and software components of the computer being used to establish a network connection. Once the settings from the profile are applied, the computer may be controlled to initiate a network connection. The computer may be controlled in a conventional way or in any other suitable way.

At decision block 522, the process branches depending on whether user input is required to complete a connection attempt. User input may be required, for example, if the candidate profile being tried at block 520 specifies a network configuration that requires user credentials. If user input is required, the process branches to block 524.

At block 524, user input is obtained. In general, the processing associated with each of the blocks in FIG. 5 may be performed at any suitable time and need not be performed in the order indicated. As a specific example, processing at block 524 may be performed at the outset of the connection process illustrated in FIG. 5, at a point in the process when user input is required, or at any other suitable time. User input may be obtained at block 524 by presenting a request to a user through a user interface. However, in some scenarios, user input may have been previously obtained and cached within the computer. If credential information or other information from a user is required to complete a connection attempt is cached on the computer, processing at block 524 may involve obtaining the information from the cache.

Regardless of how the information is obtained, once the information is available, the process returns to block 520. At block 520, the process of attempting a network connection with the computer configured according to the candidate profile is continued. If additional user input is required, the process may move back through decision block 522 and block 524.

Once the connection attempt is finished, the process continues to decision block 526. At decision block 526, the process branches depending on whether the connection attempt succeeded. If the connection attempt was not successful, the process continues to decision block 528. At decision block 528, the process further branches depending on whether there are further candidate profiles.

At block 526, results of prior connection attempts may be used to select a next candidate. For example, if a prior connection attempt failed during 802.11 authentication, other profiles that use 802.11 may be omitted from the list of candidate profiles.

Regardless of how a determination is made of whether additional candidate profiles exist, if more candidate profiles exist, the process branches to block 530. At block 530, the next candidate profile is obtained. In the illustrated embodiment, candidate profiles are developed at 516 and ordered at block 518. The ordered candidate profiles may be stored in a list or other data structure. In that embodiment, processing at block 530 may involve reading the next candidate profile from the data structure. However, it is not a requirement that candidate profiles be generated and saved in advance. In some embodiments, processing at block 530 may involve generating settings for next candidate profile.

Regardless of how the next candidate profile is obtained at block 530, processing returns to block 520 where a connection attempt is made using the candidate profile. Processing at block 520 for the candidate profile is selected at block 530 may be as described above. If the connection attempt is not successful, the process will again return to decision block 528. If more candidate profiles exist in the list, the process will again branch through block 530 where the next candidate profile is selected and a connection attempt is made with that candidate profile.

If processing ultimately reaches decision block 528 and no more candidate profiles exist, the processing branches to error termination point 544. If processing reaches error termination point 544, no candidate profile could establish a connection. Processing at error termination point may be in any suitable form, such as notifying the user that the connection attempt failed. Such processing could also include initiating diagnostic routines to provide the user with additional guidance about the problem.

However, if any of the candidate profiles results in a successful connection, the process will branch from decision block 526 to block 540. When processing reaches block 540, a candidate profile has been identified. The settings specified in the identified candidate profile may be used for communication over the network. For example, in the embodiment of FIG. 2, applications such as $216_1$, $216_2$ and through $216_3$ may thereafter communicate over the network using the configuration settings of the candidate profile. In addition to using an identified profile to establish a connection for immediate use, an identified profile may be stored for later use. Storage of a profile may be based on a user-supplied preference. Accordingly, at decision block 560, the process branches depending on whether a user has indicated a preference to store identified profiles. The user preference may be indicated at the time the user requests a connection to be established. Alternatively, the user may be prompted through a user interface to specify a preference after a candidate profile has been selected or the user preference may be specified in any other suitable way.

Regardless of when and how a user specifies a preference, if the user has indicated a preference to store an identified profile, processing branches to block 562. At block 562, the identified profile is stored. When the process of FIG. 5 is performed on a computer such as is illustrated in FIG. 2, the identified profile may be stored in a cache, such as cache 224. However, any suitable mechanism may be used to store an identified profile for later use.

Conversely, if a user has indicated a preference to not store identified profiles, the process branches from decision block 560 to block 564. At block 564, processing to delete the profile is performed. The specific processing at block 564 may depend on the mechanism to temporarily store a profile as part of an automated configuration process. For example, processing at block 564 may involve setting a flag or otherwise storing an indication in connection with a temporary profile that it should be deleted when a connection session ends. At the end of the session, the temporarily stored profile may be deleted from memory.

Any suitable criteria may be used to identify when a session has ended. For example, a temporarily stored profile may be deleted in response to express user input to terminate a connection. Additionally, shutdown of a computer on which the process of FIG. 5 is executing may also be taken as an indication that a session has ended and a temporarily stored profile should be deleted.

In some embodiments, a temporarily stored profile may be deleted as soon as a connection is established based on that profile. However, in some embodiments, it may be desirable to retain the temporarily stored profile until a communication session established using that connection is ended. By retaining the temporary profile until the session ends, a connection can be simply restored if the transmission or other temporary error disrupts the connection before the session is completed.

At block 562, the identified candidate profile may be stored for future use. In a subsequent attempt to connect to the network identified at block 510, the automated configuration software may forgo the discovery process and use a previously identified profile that has been stored.

Figure 6:
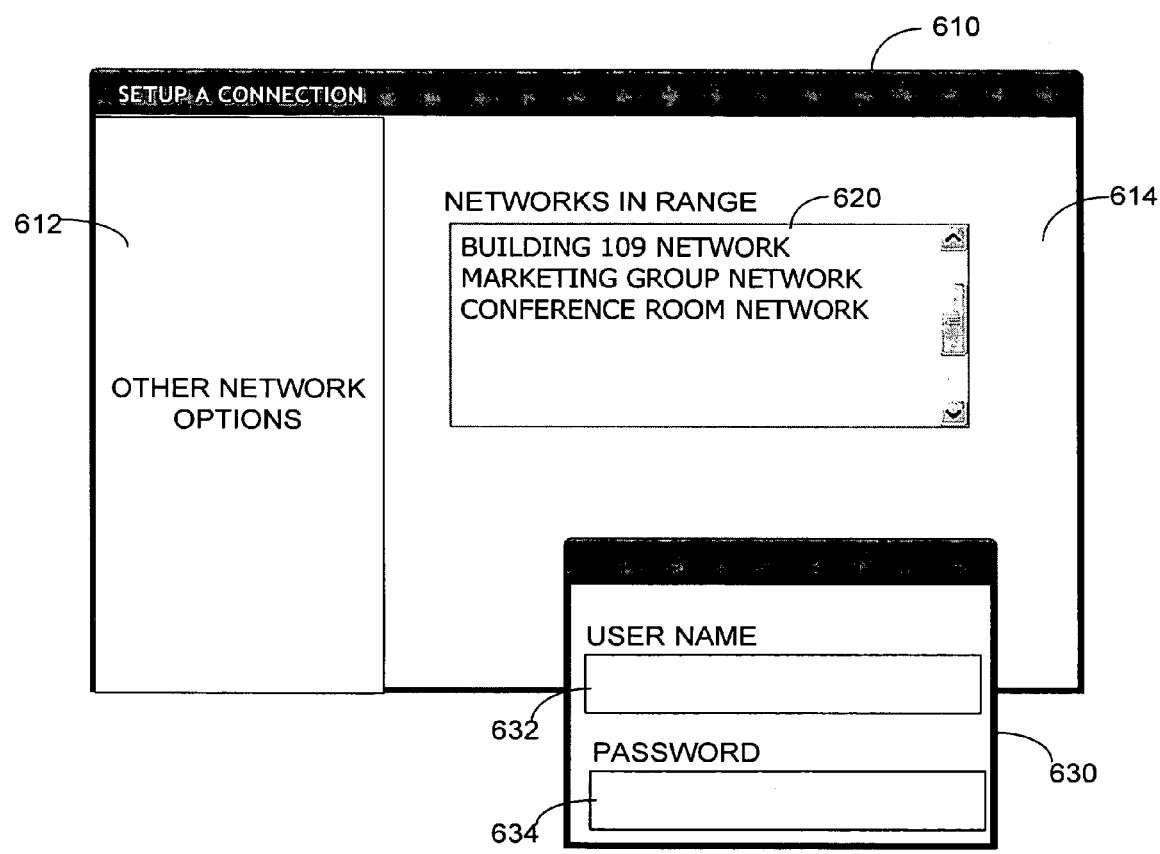
FIG. 6 is a sketch of a user interface according to an embodiment of the invention.

Turning to FIG. 6, an example is provided of a graphical user interface 610 that may be used to obtain user information during an automated configuration process. Graphical user interface 610 is in a form that may be presented to a user through a display screen on a computer. Graphical user interface 610 may be created using known computer programming techniques, or in any other suitable way. Graphical user interface 610 may include one or more panes containing different types of information. Pane 612 may contain information on other network options unrelated to configuring a computer for connection to a specific network. Pane 614 contains information on the network for which a connection is desired. The information may be obtained from the user in any suitable way. In this example, a list box 620 is used to present to the user a collection of networks that are available. In the illustrated example, graphical user interface 610 may be used to establish a wireless network connection. Accordingly, the networks displayed in list box 620 are wireless networks. The specific networks for which a connection is possible may be identified in any suitable way. In this example, a wireless network card may be programmed to monitor beacon signals transmitted by access points for the networks, resulting in an identification of available networks in wireless range of the computer on which graphical user interface 610 is displayed. Regardless of how the list of available networks is obtained, the list may be presented to the user in a fashion that allows the user to select a network. For example, in a graphical user interface, a user may interact with the interface using a mouse or similar pointing device to make a selection from list window 620.

Once a network is selected, if additional information is required from the user as part of the automated configuration process, the graphical user interface presented to the user may change in order to obtain the additional information. In the embodiment illustrated in FIG. 6, the graphical user interface changes through the display of dialog box 630. Dialog box 630 may be configured to prompt the user for specific pieces of information required. In this example, dialog box 630 is configured to prompt the user for credential information. Accordingly, dialog box 630 includes a field 632 for the user to enter a user name. Dialog box 630 also includes a field 634 prompting the user to enter a password. However, any suitable method may be used to prompt a user for information. Further, the specific information for which the user is prompted may depend on the specific network selected through list box 620. For networks that do not require credential information, dialog box 630 may not be used. Conversely, if the selected network requires multiple types of information, dialog boxes that are different than dialog box 630 may appear and/or dialog boxes in addition to dialog box 630 may be presented to the user.

FIG. 6 illustrates an interactive mechanism for obtaining user information. It is not a limitation on the invention that user information be obtained interactively and any suitable mechanism for obtaining the required information may be used.

Having thus described several aspects of at least one embodiment of this invention, it is to be appreciated that various alterations, modifications, and improvements will readily occur to those skilled in the art.

Such alterations, modifications, and improvements are intended to be part of this disclosure, and are intended to be within the spirit and scope of the invention. Accordingly, the foregoing description and drawings are by way of example only.

The above-described embodiments of the present invention can be implemented in any of numerous ways. For example, the embodiments may be implemented using hardware, software or a combination thereof. When implemented in software, the software code can be executed on any suitable processor or collection of processors, whether provided in a single computer or distributed among multiple computers.

Further, it should be appreciated that a computer may be embodied in any of a number of forms, such as a rack-mounted computer, a desktop computer, a laptop computer, or a tablet computer. Additionally, a computer may be embedded in a device not generally regarded as a computer but with suitable processing capabilities, including a Personal Digital Assistant (PDA), a smart phone or any other suitable portable or fixed electronic device.

Also, a computer may have one or more input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface including keyboards, and pointing devices, such as mice, touch pads, and digitizing tables. As another example, a computer may receive input information through speech recognition or in other audible format.

Such computers may be interconnected by one or more networks in any suitable form, including as a local area network or a wide area network, such as an enterprise network or the Internet. Such networks may be based on any suitable technology and may operate according to any suitable protocol and may include wireless networks, wired networks or fiber optic networks.

Also, the various methods or processes outlined herein may be coded as software that is executable on one or more processors that employ any one of a variety of operating systems or platforms. Additionally, such software may be written using any of a number of suitable programming languages and/or conventional programming or scripting tools, and also may be compiled as executable machine language code or intermediate code that is executed on a framework or virtual machine.

In this respect, the invention may be embodied as a computer readable medium (or multiple computer readable media) (e.g., a computer memory, one or more floppy discs, compact discs, optical discs, magnetic tapes, flash memories, circuit configurations in Field Programmable Gate Arrays or other semiconductor devices, etc.) encoded with one or more programs that, when executed on one or more computers or other processors, perform methods that implement the various embodiments of the invention discussed above. The computer readable medium or media can be transportable, such that the program or programs stored thereon can be loaded onto one or more different computers or other processors to implement various aspects of the present invention as discussed above.

The terms "program" or "software" are used herein in a generic sense to refer to any type of computer code or set of computer-executable instructions that can be employed to program a computer or other processor to implement various aspects of the present invention as discussed above. Additionally, it should be appreciated that according to one aspect of this embodiment, one or more computer programs that when executed perform methods of the present invention need not reside on a single computer or processor, but may be distributed in a modular fashion amongst a number of different computers or processors to implement various aspects of the present invention.

Computer-executable instructions may be in many forms, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

Various aspects of the present invention may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

What is claimed is:

1. A method of operating a computer, the method comprising:
   a) developing, by at least one computer processor, a plurality of candidate profiles responsive to receiving information identifying one network that the at least one computer processor is not connected to, the plurality of candidate profiles configured for attempting a first connection to the network via an access point, each candidate profile based on preliminary and incomplete information about connecting to the one network obtained from the access point;
   b) adding, by the at least one computer processor, connection setting information to complete each of the candidate profiles;
   c) attempting to connect to the access point using at least one of the plurality of candidate profiles;
   d) identifying, by the at least one computer processor, an identified profile from the plurality of candidate profiles with which access to the network through the access point can be achieved; and
   e) configuring the computer for access to the network based on the identified candidate profile.

2. The method of claim 1, wherein the network has at least one access point and developing the plurality of candidate profiles comprises developing the plurality of candidate profiles to be consistent with at least one security setting identified in a communication from the access point.

3. The method of claim 2, wherein the network is a wireless network and developing the plurality of candidate profiles comprises generating automatically, by the computer, configuration data for each of the candidate profiles to be compatible with a security setting identified in a beacon frame transmitted by the access point.

4. The method of claim 1, wherein identifying the identified profile comprises attempting to connect to the network through at least a subset of the plurality of candidate profiles to identify a candidate profile for which a connection is successful.

5. The method of claim 4, wherein attempting to connect to the network through at least the subset of the plurality of candidate profiles comprises attempting to connect to the network using profiles in the plurality of candidate profiles in an order related to the level of security provided by a connection in accordance with each candidate profile.

6. The method of claim 4, wherein developing the plurality of candidate profiles comprises developing the plurality of candidate profiles in advance of attempting to connect to the network through at least the subset of the plurality of candidate profiles.

7. The method of claim 4, further comprising:
f) receiving from a user security information; and
g) caching the security information;
wherein, attempting to connect to the network comprises attempting to connect to the network with at least one of the plurality of candidate profiles using the cached security information.

8. A computer-readable storage medium having computer-executable modules stored thereon wherein the medium does not consist of a transitory signal, the modules comprising:
a) a driver adapted to control a network interface card to communicate over a network;
b) a discovery engine, coupled to the driver, adapted to create a plurality of candidate configurations responsive to receiving preliminary and incomplete information about connecting to one network and to add connection setting information to complete each of the candidate configurations, the plurality of candidate configurations for attempting to establish a first connection to the network through an access point and to define outgoing network communications provided to the driver, the outgoing network communications using the plurality of candidate configurations, the discovery engine being further adapted to analyze incoming network communications to select a selected configuration of the plurality of candidate configurations supporting communication to the network through the access point; and
c) at least one control component adapted to control the driver to use the selected configuration for communication to the network.

9. The computer-readable storage medium of claim 8, wherein:
the at least one control component comprises at least one interface to an additional module, and
the computer-readable medium further comprises at least one additional module providing through the at least one interface configuration information usable by the discovery engine to define at least one outgoing network communication according to at least one of the plurality of candidate configurations.

10. The computer-readable storage medium of claim 9, wherein:
the computer-executable modules are adapted for use in a computer having a hardware component that supports non-standardized configuration settings; and
the at least one additional module provides information relating to the non-standardized configuration settings.

11. The computer-readable storage medium of claim 9, wherein the at least one additional module executes a method for negotiating an authentication process.

12. The computer-readable storage medium of claim 8, wherein the computer-readable medium further comprises an interface module adapted to obtain security information from a user.

13. The computer-readable storage medium of claim 12, wherein the computer-readable medium further comprises a cache adapted to store the security information in conjunction with information defining the selected configuration.

14. The computer-readable storage medium of claim 12, wherein the discovery engine is adapted to define outgoing network communications using the plurality of candidate configurations successively in an order based on a level of security identified in each of the plurality of candidate configurations.

15. A method of configuring a computer having an operating system, the method comprising configuring the computer to execute acts of:
receiving, from a software module and at least one hardware component configured to interact with the operating system, information on settings on the hardware component;
configuring the at least one hardware component to communicate with a network based on the received information on settings on the hardware component;
responsive to receiving information from an access point identifying one network, developing a plurality of candidate profiles defining communication settings, the plurality of candidate profiles based upon preliminary and incomplete information obtained from the access point about connecting to the one network and further based upon connection setting information added by the computer to complete each of the candidate profiles, wherein each candidate profile is configured for attempting connection to the one network via the access point; and
identifying a selected candidate profile from the plurality of candidate profiles for accessing the access point by controlling the computer to attempt communication in accordance with at least one candidate profile of the plurality of candidate profiles.

16. The method of claim 15, wherein:
the hardware component comprises a wireless network interface card adapted to operate according to a wireless standard, the wireless standard specifying a plurality of security configurations,
the wireless network interface card is adapted to operate according to a non-standardized security configuration not required by the wireless standard; and
the software component provides information on the at least one non-standardized security setting.

17. The method of claim 15, wherein:
the operating system comprises an interface; and
the method further comprises installing the software component to interact with the operating system through the interface.

18. The method of claim 15, wherein:
the operating system is adapted to interact with a second software module that executes steps in a process of authenticating a client to an access point; and
the method further comprises installing the second software module in the computer.

19. The method of claim 15, further comprising:
receiving through a user interface security information; and
caching the security information;
wherein controlling the computer to attempt communication in accordance with candidate profiles of the plurality of candidate profiles comprises using the cached security information for communication in accordance with at least two of the plurality of candidate profiles.

20. The method of claim 19, wherein receiving security information comprises receiving a password.

* * * * *